May 27, 1952 T. E. BEACHAM 2,598,210
FILTER
Filed June 1, 1946 3 Sheets-Sheet 1

INVENTOR
THOMAS E. BEACHAM
BY
ATTORNEY

INVENTOR
THOMAS E. BEACHAM
BY
ATTORNEY

May 27, 1952 T. E. BEACHAM 2,598,210
FILTER
Filed June 1, 1946 3 Sheets-Sheet 3

INVENTOR
THOMAS E. BEACHAM
BY
ATTORNEY

Patented May 27, 1952

2,598,210

UNITED STATES PATENT OFFICE 2,598,210

FILTER

Thomas Edward Beacham, London, England

Application June 1, 1946, Serial No. 673,767
In Great Britain June 1, 1945

5 Claims. (Cl. 210—150.5)

This invention relates to filters, and has reference to that type of filter where renewable filter elements are employed. The primary object of the invention is to provide a filter having a replaceable filter element which is cheap to manufacture and easy to fit or replace.

According to the present invention there is provided a filter comprising a supporting block having perforations leading to an outlet or inlet and a replaceable flexible filtering element adapted to be wrapped around said block.

The invention also comprises a filter comprising a supporting member having a surface thereon corrugated or similarly shaped to increase the superficial area thereof and having perforations in said surface, and a separate replaceable filter element closely engaging said surface.

The arrangement according to the present invention is such that the replaceable filter element can be of thin, fragile material such as paper, supported upon the perforated support so that the danger of the filter being ruptured or damaged is substantially eliminated.

Figure 1:
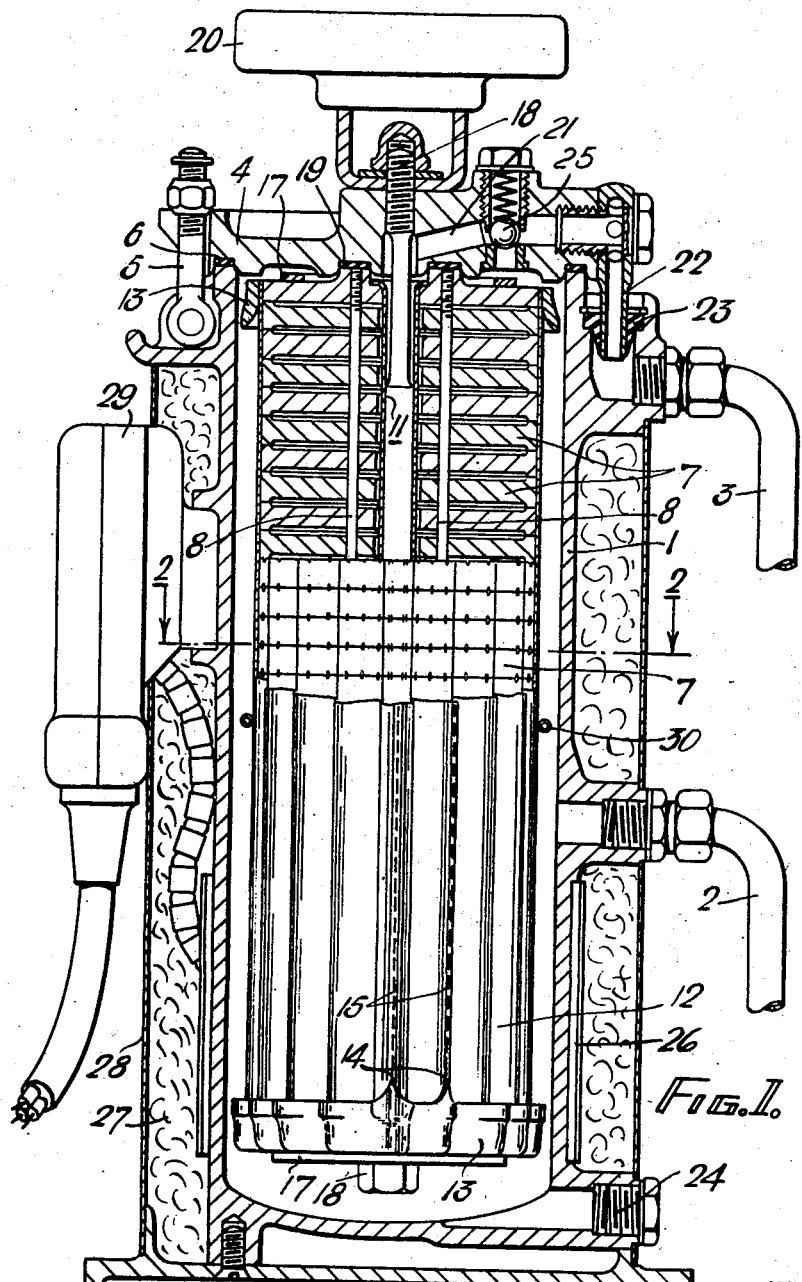
Figure 2:
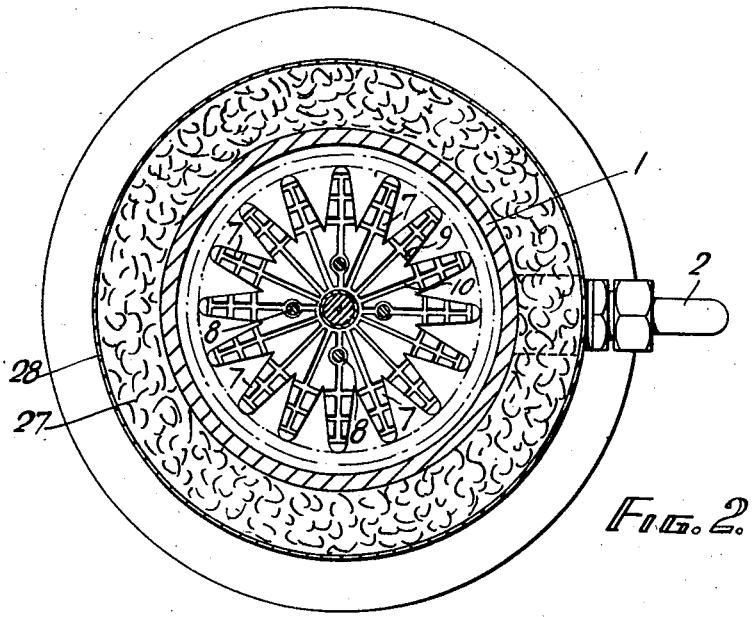
Figure 3:
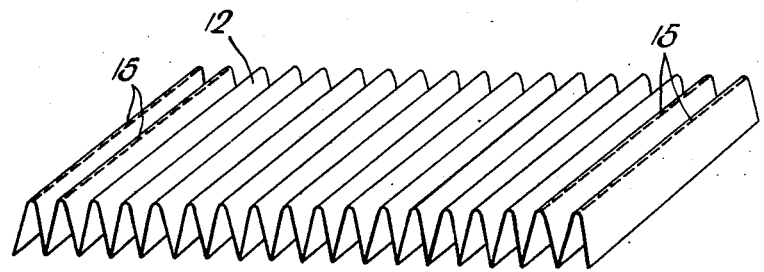
Figures 4, 5:
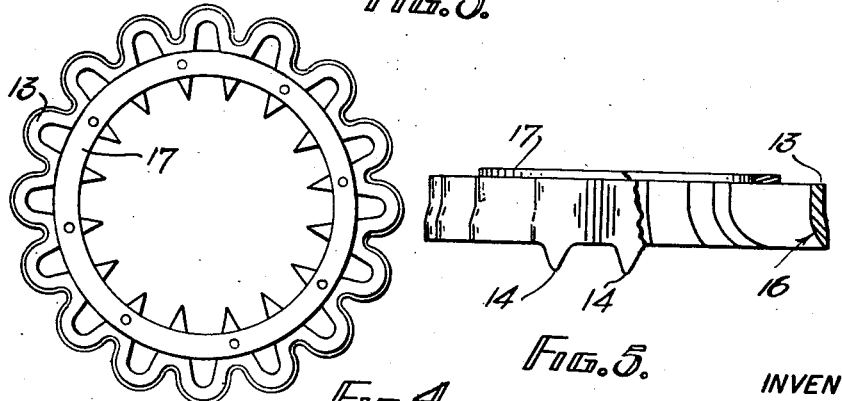
Figure 7:
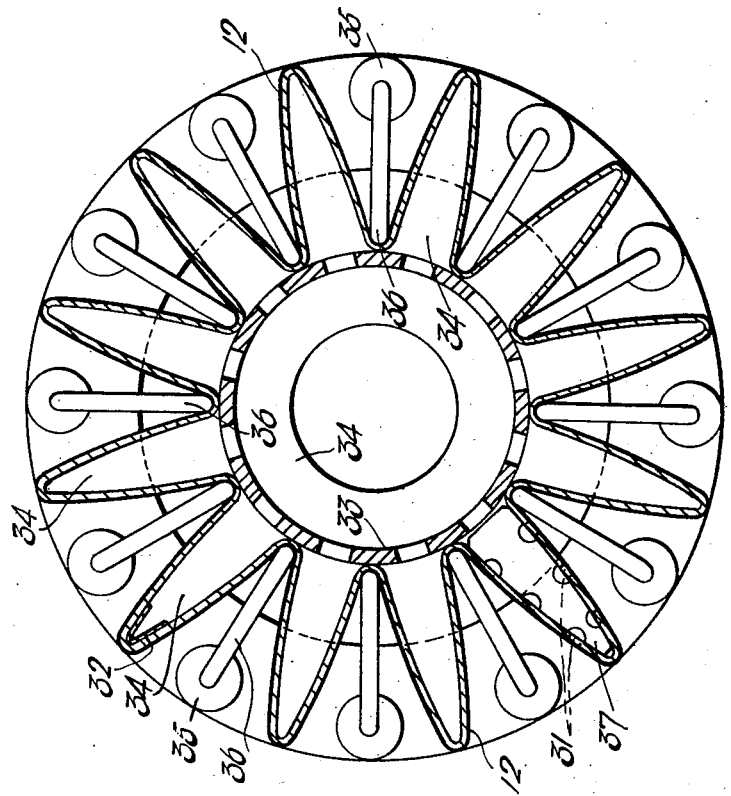
Figure 8:
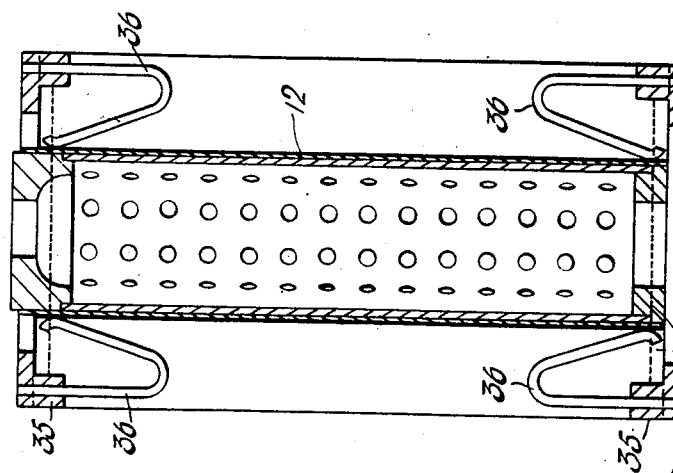

In the accompanying drawings is shown, by way of example, one embodiment of the invention; and certain details of modified arrangements; in these drawings Figure 1 is a vertical section through a complete filter, Figure 2 is a section on the line 2—2 of Figure 1, but omitting the thermostatic switch, Figure 3 is a perspective view of one of the replaceable filter elements suitable for the filter shown in Figures 1 and 2, Figure 4 is a plan view of the end cap shown in Figure 1, Figure 5 is a section of the end cap shown in Figure 4, Figure 6 is a vertical section through an alternative form of support member, and Figure 7 is a section on the line 7—7 of Figure 6.

In the construction shown in Figure 1, the filter comprises a cylindrical casing 1 having an inlet 2 and an outlet 3 for the liquid, for example oil, to be cleaned. The casing is formed with an integral closure at its lower end, whilst the upper end is provided with a removable cap 4 held down on the casing by swing bolts 5, with a suitable sealing washer 6.

The cap 4 supports the main body of the filter proper which consists of a stack of elements 7 assembled upon bolts 8. With the exception of the two end members of the stack, the individual elements are identical and consist each of star shaped members of a molded or cast plastic or light metal alloy, the upper and lower surfaces of which are formed with grooves 9, as shown in Figure 2, which are roughly circumferential, and which communicate with radial grooves 10 leading to a central opening 11. Thus when two elements are placed face to face there is formed between them a series of passages extending from the central opening to the outer corrugated surfaces of the elements. The two end elements are similar in profile to the other elements, but are provided with grooves on the inner surfaces only.

Wrapped round the outer corrugated surface of the support elements 7 is a filter 12 of corrugated paper, which before being applied to the support is preformed, in the manner shown in Figure 3, with corrugations to match the corrugations of the support so as to ensure close contact between the support and the filter element. The number of corrugations in the filter element is greater than the corrugations of the support so that the filter element will overlap its ends when it is wrapped round the support.

Upon the ends of the stack of support elements are two end rings 13 which hold the filter element upon the corrugated surface of the support. The rings are formed with an internal star-shaped hole, shown in Figure 5, which corresponds accurately with the profile of the individual elements. The side walls of the end rings are shaped to embrace the corrugated surface but to be spaced therefrom by a distance just sufficient to accommodate the thickness of the filter element. At the overlap of the filter element there are two thicknesses of the material of which it is composed; the end rings are accordingly shaped to allow this spacing over the necessary number of corrugations, for example two corrugations, and these corrugations are marked with pointers 14.

To facilitate correct assembly of the filter after replacement of a filter element the element may be marked in suitable manner, for example by a red line 15, on the top of the last two corrugations at each end. In assembling the filter the overlap will then be marked by the red lines and by registering the pointers 14 with the red lines the correct position of the end rings 13 with respect to the overlap is obtained.

The end rings are also shaped so as to allow them to be slipped on to the end of the support with the filter element in position by slightly coning and curving the mouth of the ring as shown at 16. A stop ring 17 is secured to the ring to hold the ring on the end of the support assembly. The end rings may however be coned on their internal side surfaces and the ring may then be held on the ends of the stack of elements by springs.

The assembled filter body is secured to the cap 4 of the casing by a bolt 18 which passes through the central opening in the stack of support elements and is threaded into the cap 4 with an interposed sealing washer 19. The bolt may also be used to fasten a handle 20 to the cap; the handle may be heat-insulated.

In use, dirty oil or other fluid under pressure enters the casing through the inlet 2 and then passes through the filter element and the passages in the support member to the central opening 11. The fluid then passes upwardly to the passageway 21 in the cap 4 and thence to the outlet 3. In order to enable the cap 4 to be removed easily without the need for unscrewing pipe connections, the outlet pipe 3 is secured to the casing 1, and the connection between the passageway 21 in the cap and the outlet is made by a self-sealing connection comprising a spout 22 which enters a self-sealing ring 23. Sludge collecting in the casing may be drained off through the sludge outlet 24.

If desired a safety valve 25 may be provided to by-pass the filter element in the event of excessive pressure arising within the casing. When the filter is installed in a closed circuit system, for example in the lubrication system of an internal combustion engine, it may be arranged that the by-pass valve is partly open at the normal working pressure, to allow some of the oil to by-pass the filter.

In some installations it may be desired to provide heating for the casing 1, and as shown in Figure 1 this may be effected by an electric heater element 26 secured to the lower part of the casing. The casing may be suitably lagged by heat insulating material 27 in the space between the casing 1 and an outer casing 28. A thermostatic control element 29 may be provided for the heater current. Other forms of heating such as a hot water jacket may be used if desired in place of electric heating.

When a long stack of support elements 7 are used, with a correspondingly long filter element one or more spring rings 30 may be used to hold the filter element upon the support. This ring merely serves to hold the filter element in position in assembly and during periods of non-use of the filter; in operation the fluid pressure holds the filter element in close contact with the surface of the support. This close contact provides good mechanical support for the filter element and in addition a good seal at the ends and at the overlap of the filter element. The end rings 13 are not so tight a fit upon the filter element as to effect a seal to prevent the unfiltered liquid passing under the ends of the filter element, but ensure that the seal will be effected by fluid pressure when the filter is in operation.

In Figure 6 is shown an alternative construction for the support element and for the end ring. In this case the star-shaped support is formed from perforated metal sheet, the sheet being corrugated and shaped as shown to provide a star-shaped support 31, the ends of the support being joined at 32. To provide improved stiffening, the support may be soldered or welded to a central perforated tube 33. Star-shaped end closures 34 are provided at the ends of the support, and the end rings 35 include a series of hair pin springs 36 which are adapted to hold the ends of the filter element against the surface of the support. In order to decrease the volume of the filter on the clean side of the filter element, a series of perforated filling members 37 may be arranged within the hollow spaces between the support 31 and the stiffening tube 33.

I claim:

1. A filter comprising a closed, cylindrical casing, an inlet and an outlet through the wall of the casing, a plurality of generally circular, identical plates mounted axially in said casing in face-to-face relationship, said plates being provided with aligned axial openings through said plates in communication with the casing outlet, identical radiating fingers on the circumference of each plate, the fingers on the various plates being in lateral alignment, passageways connecting the side surfaces of the fingers to the axial openings, a preformed, corrugated filter having parallel corrugations of the same cross section and spacing as the plan configuration and spacing of the fingers mounted around the plates with the corrugations nesting over the fingers, and a cap over each end of the plates and filter.

2. The filter of claim 1 wherein the end caps have shoulders extending over the adjacent edge of the filter for holding the corrugations nested in the plate fingers, and wherein one of the caps is readily removable so that the filter may be removed from the fingers of the plates.

3. The filter of claim 2 wherein at least one shoulder on each cap is spaced outwardly from the cap center to accommodate an additional thickness of the filter.

4. A filter comprising a casing open at one end, a removable closure member disposed over said open end, a stack of identical plates having radiating fingers in lateral alignment with corresponding fingers of other plates mounted on the inside of the closure member so as to extend into the casing, axial passageways through said plates, an outlet through the closure member communicating with said axial passageways, radial passageways opening into the peripheral surfaces of the fingers of said plates and communicating with said axial passageways, a preformed, corrugated filter having parallel corrugations of the same cross section and spacing as the plan configuration and spacing of the fingers mounted around the plates with the corrugations nesting over the fingers, a substantially fluid-tight closure assembly over the free end of the stack of plates and filter, and an inlet through the casing.

5. A filter comprising a cylindrical casing, an inlet and an outlet through the casing, a plurality of generally circular, identical plates having a central hole in each and coaxially mounted in the casing in face-to-face relationship, the periphery of each plate carrying a selected number of radiating fingers with the fingers of the various plates being in lateral alignment, a preformed corrugated filter wherein the cross section of each corrugation is substantially the same as the plan configuration of each finger on each plate nested over the fingers of the various plates, a passageway connecting the axial central hole of the plates to the outlet, passageways connecting the side surfaces of the radiating fingers to the central axial hole of the plates, and closure means over both ends of the stack of plates and filter so as to force fluid entering the inlet of the casing through the filter and the plates to the outlet of the casing.

THOMAS EDWARD BEACHAM.

REFERENCES CITED

The following references are of record in the file of this patent:

UNITED STATES PATENTS

| Number | Name | Date |
|---|---|---|
| 1,331,732 | Wait | Feb. 24, 1920 |
| 1,688,326 | Boulade | Oct. 23, 1928 |
| 1,723,945 | McCutcheon | Aug. 6, 1929 |
| 1,741,705 | Liddell | Dec. 31, 1929 |
| 1,758,284 | Gronning | May 13, 1930 |
| 1,758,412 | Sheppy | May 13, 1930 |
| 1,884,615 | Dooley | Oct. 25, 1932 |
| 1,896,395 | Dooley | Feb. 7, 1933 |
| 2,057,814 | Barrett | Oct. 20, 1936 |
| 2,107,406 | Wood | Feb. 8, 1938 |
| 2,145,535 | Vokes | Jan. 31, 1939 |
| 2,279,423 | Vokes | Apr. 14, 1942 |
| 2,411,341 | Shepard | Nov. 19, 1946 |

FOREIGN PATENTS

| Number | Country | Date |
|---|---|---|
| 358,496 | Great Britain | Oct. 5, 1931 |
| 406,086 | Great Britain | Feb. 22, 1934 |
| 501,667 | Great Britain | Mar. 3, 1939 |
| 131,135 | Germany | June 6, 1902 |